Aug. 12, 1958 D. L. FAVIN 2,847,572

SYNCHRONIZED AUTOMATIC FREQUENCY CONTROL SYSTEM

Filed March 20, 1956 2 Sheets-Sheet 1

INVENTOR
D. L. FAVIN
BY Patrick J. Roche
ATTORNEY

INVENTOR
D. L. FAVIN
BY Patrick J. Roche
ATTORNEY

United States Patent Office 2,847,572

Patented Aug. 12, 1958

2,847,572

SYNCHRONIZED AUTOMATIC FREQUENCY CONTROL SYSTEM

David L. Favin, Whippany, N. J., assignor to Bell Telephone Laboratories, Incorporated, New York, N. Y., a corporation of New York Application March 20, 1956, Serial No. 572,751

12 Claims. (Cl. 250—36)

This invention relates to an automatic frequency control system, and more specifically to such system for automatically effecting lock-in between the frequencies of two signal sources at a predetermined difference therebetween after the signal of one source has been interrupted and subsequently restored.

In certain radio systems covering relatively large geographical areas, problems relating to transmission equalization may require a statistical investigation of transmission changes as a function of atmospheric conditions, time and locality. As an aid to such investigation, the signals of two oscillators, one remove and the other local, may be swept in frequency over preselected ranges which are different but which partly overlap, and the signals are tracked at a predetermined intermediate frequency therebetween. The detected I. F. signals may be recorded photographically from suitable measuring apparatus at discrete time intervals during each twenty-four hour period at a terminal including the local oscillator on an unattended basis for time periods as long as ten days or more. Since the signals of the remote oscillator incoming to the local unattended terminal may fade or be interrupted for indeterminate periods of time, the investigation equipment may lie in an inoperative condition at the unattended station for several days until it is noted and corrected by an operating attendant. This situation would tend to render useless the I. F. signals recorded prior to the time of the signal fading or interruption, and thereby require a new start from a time standpoint for the investigation. Such procedure would involve unnecessary time delays and costs. On the other hand, the assignment of operating personnel to the unattended station for each twenty-four hour interval during the overall investigation period would also appear to entail an unnecessary expense.

The present invention therefore contemplates an automatic frequency control for an oscillator located in a local unattended radio terminal to enable such oscillator to resume automatically lock-in of the signal frequency thereof to the signal frequency of a remote oscillator at a predetermined difference therebetween after the remote signal has been interrupted at the unattended station and then later has been reestablished thereat.

It is an object of the invention to maintain automatically a synchronous relation between the frequencies of the signals of two sources regardless of interruptions of the signal of one source.

It is another object to restore automatically the tracking of the signals of two oscillators at a predetermined frequency relation therebetween after the signal of one oscillator disappears and subsequently reappears.

It is a further object to restore lock-in automatically between the frequencies of the signals of two geographically spaced generators at a predetermined difference therebetween, after the signal of a remote generator fades or is interrupted at a terminal including the other signal generator and is subsequently reestablished thereat.

It is also another object to restore lock-in automatically between the frequencies of the signals of two sources at a predetermined difference therebetween after an interruption and restoration of one signal, on the basis of information contained in such one signal.

A conventional type of radio system comprises a remote terminal including a variable frequency oscillator swept cyclically in frequency over a preselected range at a certain time-rate; and a local terminal including a converter for mixing the signal incoming thereto from the remote terminal and the signal supplied thereto from a local oscillator, the signal from the latter oscillator being swept over a further preselected range which is different from and partly overlaps the preselected frequency range of the remote oscillator. The converter output includes an I. F. component having a frequency equal to a predetermined frequency difference between the signals of the two oscillators. The frequency sweep of the local oscillator may be controlled by either a frequency discriminator in response to a portion of a predetermined I. F. component or other means on a cyclical basis. The other portion of the predetermined I. F component is supplied to a suitable amplifier-detector and load.

In accordance with a specific embodiment of the present invention, a synchronizing control connected to the output of the converter controls the connection of the frequency discriminator or other sweep means one at a time to the local oscillator in response to the magnitude of the I. F. component available in the output of the converter. When the remote signal fades or is interrupted at the converter the synchronizing control disconnects the frequency discriminator from the local oscillator and substantially at the same time connects the other sweep means thereto whereby the frequency of the signal of the local oscillator is swept over the preselected range at a time-rate different from the certain time-rate sweep of the remote oscillator.

Upon the reappearance of the remote signal at the converter, the converter output will in due course include the predetermined I. F. component having a relatively long time-duration. This component applied to the synchronizing control is integrated in an integrator network included therein for providing an average voltage magnitude which is sufficient to effect a disconnection of the other sweep means from the local oscillator and approximately at the same time to connect the frequency discriminator thereto. The frequency discriminator then controls the sweep signal frequency of the local oscillator at a time rate which is substantially the same as the certain time-rate sweep of the remote signal frequency thereby locking-in the signal frequency of the local oscillator to the signal frequency of the remote oscillator at a frequency difference equal to the predetermined frequency of the I. F. component.

The synchronizing control effects lock-in in one instance under the conditions when the numerical value of the frequency of the remote signal is higher than the numerical value of the frequency of the local signal; the frequencies of both the remote and local signals are being simultaneously swept in the same numerical direction, either increasing or decreasing; and the rates of change of the frequency sweeps of the remote and local signals are substantially equal, or in other words the time-rate of frequency change of the I. F. component is approximately a minimum.

A feature of the invention resides in a modification whereby frequency lock-in between the signals of the remote and local oscillators may be effected when the numerical value of an instantaneous frequency of the local signal is higher than the numerical value of a corresponding instantaneous frequency of the remote signal.

The invention will be readily understood from the following description when taken together with the accompanying drawing in which.

Figure 1:
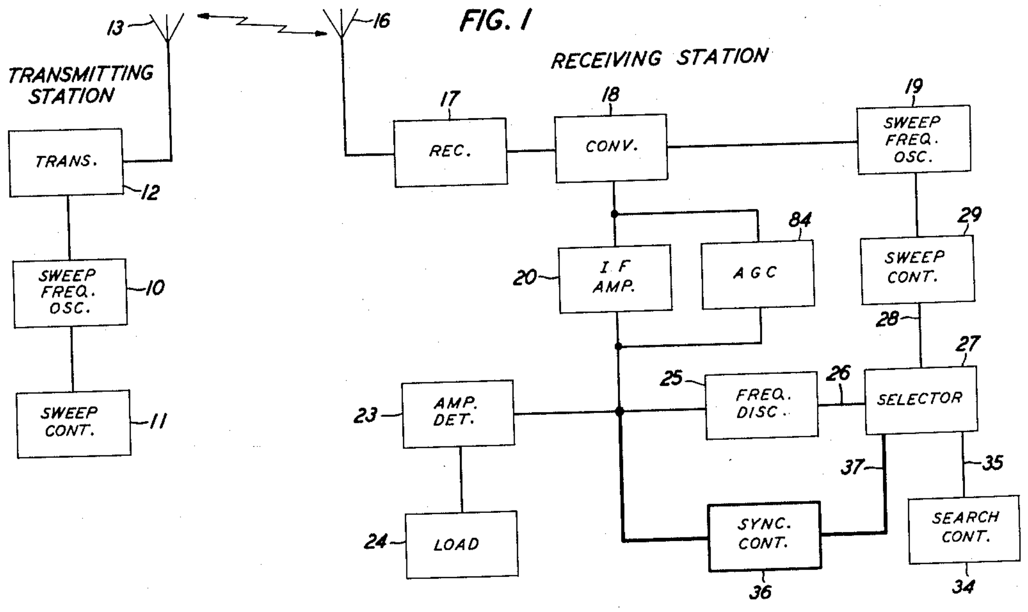
Fig. 1 is a box diagram of a radio system embodying a specific embodiment of the invention.

Referring to Fig. 1, a sweep frequency oscillator 10 provides a signal varied cyclically in frequency over a first predetermined range at a certain time-rate by a sweep control 11. These signals may be amplified, if desired, in a power transmitter 12, and then radiated from antenna 13. At a receiving station, the radiated signal picked up by antenna 16 is selected by receiver 17 and supplied to a converter 18. In the latter, the received signal is combined with a signal supplied by a local sweep frequency oscillator 19, to produce a predetermined modulation I. F. component which is selected by a tuned I. F. amplifier 20. A first portion of the selected I. F. component is amplified and detected in amplifier-detector 23 which furnishes the detected component to a load 24.

A second portion of the I. F. component selected by I. F. amplifier 20 is supplied to a frequency discriminator 25 which functions via lead 26 and selector 27 to activate over lead 28 a sweep control 29. This control then varies the frequency of the signals of local oscillator 19 over a second predetermined range which is less than but partly overlaps the first predetermined frequency range of transmitting oscillator 10, at a time-rate substantially the same as the certain time-rate frequency variation of the latter oscillator. The selector 27 involves a conventional electromagnetic relay whose structure and operation will be more fully explained hereinafter. A search control 34 also functions over lead 35 and through selector 27 to activate local sweep control 29 to vary the frequency of the signal of local oscillator 19 over the second predetermined range at a time-rate slightly different from the certain time-rate frequency variation of the signal of transmitting oscillator 10, i. e. the different time-rate may be either slightly faster or slightly slower than the certain time-rate.

At the transmitting station sweep-frequency oscillator 10 and sweep control 11 and at the transmitting station sweep-frequency oscillator 19, frequency discriminator 25, sweep control 29, and search control 34 are well known to the art; and depending on the particular frequency ranges involved; may comprise, for example, oscillator circuitry disclosed in E. P. Felch, Jr. Patent No. 2,254,601, issued September 2, 1941; or Dennis Patent No. 2,486,265, issued October 25, 1949; or M. E. Hines Patent No. 2,710,922, issued June 14, 1955.

In the operation of the afore-described circuitry, the transmitting oscillator 10 may be varied in frequency over the first predetermined range of, for example, 3700 through 4200 megacycles at the certain time-rate. Also, the receiving oscillator 19 may be varied in frequency over the second predetermined range of, for example, 3630 through 4130 megacycles, by the frequency dicriminator. The incoming and local signals mixed in the converter in the usual fashion produce a 70 megacycle I. F. component which constitutes the predetermined frequency difference therebetween and which is selected by the tuned I. F. amplifier. The frequency discriminator and amplifier-detector operate with reference to the 70-megacycle I. F. component.

Assuming, for the moment, a normal operation of the afore-described portion of the circuit according to Fig. 1, the frequency discriminator in response to the 70 megacycle I. F. component would tend to exert exclusive control over the activation of sweep control 29 and thereby over the frequency sweep of local oscillator 19. Thus, the frequency of the signal of local oscillator 19 is caused to track automatically the frequency of the signal of remote oscillator 10 at the 70 megacycle difference therebetween.

The present invention, in the event of an interruption or fading of the signal of transmitting oscillator 10 at the receiving station for indefinite periods of time, provides an arrangement which responds automatically to the reappearance of such signal at the receiving station to synchronize thereat the tracking of the frequency of the signal local oscillator 19 to the frequency of the signal of transmitting oscillator 10 at the 70 megacycle frequency difference therebetween. The present invention comprises essentially a synchronizing control 36 connected in the above-described circuit of Fig. 1 as shown by the heavy lines therein for a purpose that will be presently described.

Referring again to Fig. 1 the synchronizing control activated by a third portion of the 70 megacycle I. F. component available in the output of the tuned I. F. amplifier determines the operation of the selector over lead 37 in manner which will now be explained. The synchronizing control shown in Fig. 2 comprises terminals 38, 38 connected to the output of the tuned I. F. amplifier to receive the third portion of the 70 megacycle I. F. component when and if the latter is present thereat. These terminals are connected through a conventional voltage doubler comprising capacitor 39, rectifiers 40 and 41, capacitor 42 and resistor 43, and resistor 44 to the control grid of a pentode amplifier 45. In this amplifier, the cathode is connected through resistor 46 to ground; the anode and screen grid are connected through resistors 47 and 48, respectively to a +B voltage from a source, not shown; and the suppressor grid is connected to the cathode internally of the amplifier tube in the usual fashion.

The anode of amplifier 45 is connected through rectifier 53 and gas voltage-regulator tube 54 in series to ground. The quiescent operating voltage for amplifier 45 is so preselected that its anode to ground voltage is approximately 5 volts less than the voltage drop across voltage regulator tube 54. As a consequence, rectifier 53 is normally back-biased so that voltage regulator tube 54 provides a reference level for a voltage clipping operation which will be hereinafter explained.

An integrator network comprising resistor 55 and capacitor 56 is provided with a preselected time-constant for a purpose that will be subsequently mentioned, and connects the output of clipper rectifier 53 to the input of gas tube 57. This gas tube includes in series in its anode-cathode circuit secondary winding 58 of an alternating current transformer 59 whose primary winding is connected to a suitable commercial voltage source 52 which, for the purpose of this explanation, operates at 60 cycles and 110 volts; operating winding 61 of an electromagnetic relay 62; and resistor 63. Capacitor 64 provides a bypass for the commercial alternating current.

Relay 62 may comprise any suitable electromagnetic structure having a biased armature and is in the present instance a conventional type which, for the purpose of this explanation, may comprise armature 65 biased via coiled spring 66 to engage a first contact 67. This relay may also comprise a conventional mercury type whose armature is magnetically biased. The contact 67 is connected, as shown in Fig. 1, via lead 35 to search control 34. A second relay contact 68 is connected, as also shown in Fig. 1, through lead 26 to the frequency discriminator. Gas tube 57 is normally biased to a non-discharged condition via the potential difference appearing across the diode 53 since it has been hereinbefore assumed that the plate to ground voltage across tube 59 is greater than that of the plate to ground voltage of pentode 45. This potential difference, as above indicated, is of the order of −5 volts, and is effective across the control grid and cathode of gas tube 57 to hold the latter in the non-discharged condition. This means that when the tube rests in such condition the bias of coiled spring 66 is adequate to maintain armature 65 in engagement with the first relay contact 67 whereby search control 34 is connected to activate sweep control 29 for cyclically sweeping the signal of local oscillator 19 over the predetermined frequency range at the time-rate above-mentioned for a purpose that will presently become apparent.

Recalling from the previous explanation of the normal operation of Fig. 1 that the frequency discriminator was initially assumed via lead 26 and selector 27 to activate sweep control 29 and thereby vary the frequency of local oscillator 19 in response to the 70 megacycle I. F. component resulting from a mixing of the incoming and local signals in the converter and selected by the tuned I. F. amplifier, it will be understood for such initial assumption that armature 65 of relay 62 was caused to engage its second contact 68 in Fig. 2 in a manner that will be presently described.

Assuming now that the signal of transmitting oscillator 10 has faded or is interrupted at the receiving antenna 16, then as an initial consequence it will immediately follow that the 70 megacycle I. F. component will diminish to a negligible amount or will disappear entirely from the output of the tuned I. F. amplifier thereby resulting in a corresponding decrease or an immediate disappearance of its above-described portions at the amplifier-detector, frequency discriminator, and synchronizing control shown in Fig. 1. If, for example, the loss of the 70 megacycle I. F. component in the AFC loop including the frequency discriminator, selector, sweep control 29 and the local oscillator 19 should attain a predetermined magnitude say for example, 87 decibels, due to the fading or momentary disappearance of the incoming signal at receiving antenna 16, then it will be understood for the purpose of this explanation that such component is inadequate to vary the signal frequency of local oscillator 19 and the action in Fig. 1 will follow a condition identical with that resulting from an entire disappearance of the 70 megacycle I. F. component from the output of the tuned I. F. amplifier as further discussed below.

As a further consequence, the frequency discriminator will be no longer effective to vary the frequency of the signal supplied by local oscillator 19 for a reason that will presently appear. As still another consequence, the synchronizing control permits armature 68 of selector 27 to return to the first contact 67 of relay 62 under the influence of bias spring 66. This results in the immediate disconnection of the frequency discriminator from sweep control 29 so as to be thereby rendered ineffective to vary the frequency of the signal supplied by local oscillator 19, and substantially simultaneously therewith the connection of search control 34 to sweep control 29 so as to be thereby rendered effective to vary the frequency of the signal supplied by local oscillator 19.

Now, when the signal of transmitting oscillator 10 reappears or appears with adequate magnitude at the receiving antenna, the latter signal together with the signal of local oscillator 19 will again be mixed in the converter. In the mixing of those signals, the time-rate of the cyclical frequency sweep of the signal of local oscillator 19 under control of search control 34 will be slightly different, slower as so predetermined for this explanation, from the certain time-rate cyclical frequency sweep of the signal of transmitting oscillator 10. In due course the incoming signal from transmitting oscillator 10 and the local signal of oscillator 19 will produce a voltage pulse each time a 70 megacycle I. F. component occurs in the output of the converter whereby a train of square-wave voltage pulses corresponding to the 70 megacycle I. F. components will be produced in the output of the converter. Some of these pulses will be narrow in width or of short time-duration while others will be wide in width or long time-duration for reasons pointed out below. These I. F. voltage pulses will be selected by the tuned I. F. amplifier and each voltage pulse will be supplied thereby in one of three portions to the respective amplifier-detector, frequency discriminator, and synchronizing control. At the moment, the selected voltage pulses will be ineffective to produce any action in the frequency discriminator due to the fact that the latter has been disconnected from local sweep control 29 in the manner aforementioned, but may or may not produce any action in the synchronizing control for reasons that will presently appear.

In order to understand the foregoing more fully, the following is assumed for the purpose of the instant explanation:

$f_{10}$=center frequency of transmitting oscillator 10 in a rest position;

$f_{19}$=center frequency of local oscillator 19 in a rest position;

$\Delta f_{10}$=maximum deviation during frequency sweep of transmitting oscillator 10; and $\Delta f_{19}$=maximum deviation during frequency sweep of local oscillator 19.

Hence, the instantaneous difference frequency of between the signals of transmitting oscillator 10 and local oscillator 19 is $$\delta f=(f_{10}+\Delta f_{10}\sin\omega t)-[f_{19}+\Delta f_{19}\sin(\omega+\omega)t] \quad (1)$$

in which $(f_{10}+\Delta f_{10}\sin\omega t)=f_{10}$, the instantaneous signal frequency output of transmitting oscillator 10;

$$[f_{19}+\Delta f_{19}\sin(\omega+\Delta\omega)t]=f_{19}$$

the instantaneous signal frequency output of local oscillator 19; $\omega$ is the time-rate frequency sweep of transmitting oscillator 10; and $(\omega+\Delta\omega)$ is the time-rate frequency sweep of local oscillator 19.

From the foregoing, it is obvious that $$\delta f=f_{10}-f_{19} \quad (2)$$

Figures 2, 3:
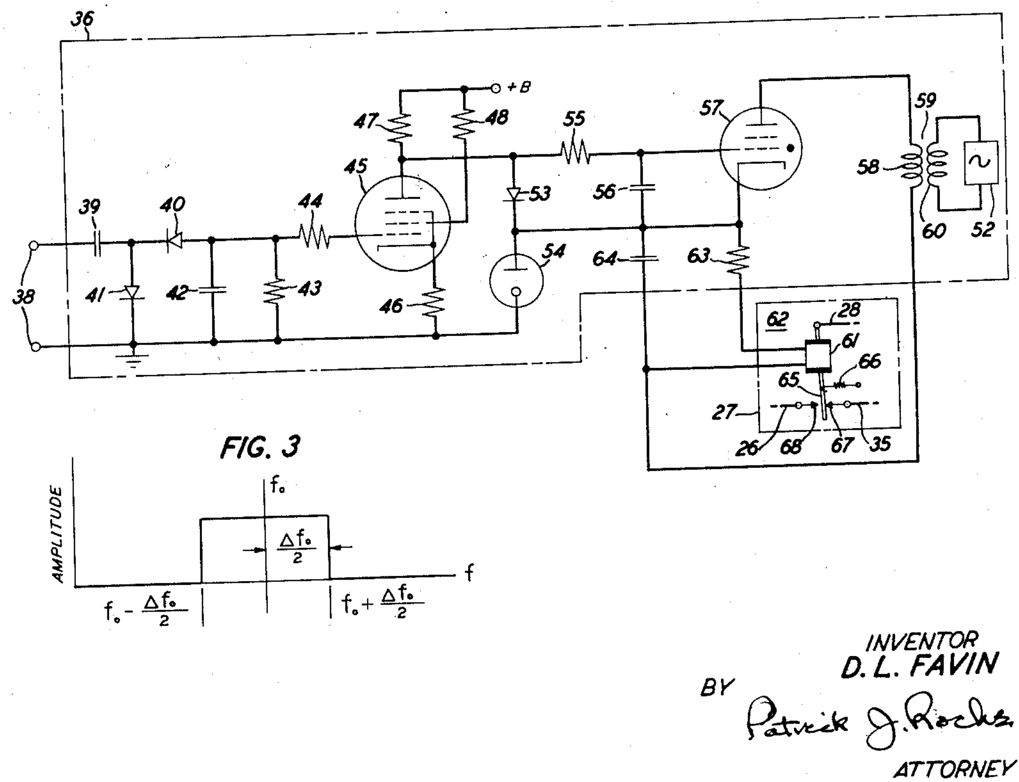
Fig. 2 is a circuit diagram of the specific embodiment of the invention shown in Fig. 1.
Fig. 3 is a curve illustrating a characteristic of a circuit element included in Fig. 1.

When the difference frequency $\delta f$ lies within the passband of the tuned I. F. amplifier, a voltage pulse will be produced in the output thereof during each interval when the following inequality is satisfied:

$$f_0+\frac{\Delta f_0}{2}\geqq|\delta f|\geqq f_0-\frac{\Delta f_0}{2} \quad (3)$$

in which $f_0$ is the mid-frequency of an ideal passband for the tuned I. F. amplifier as shown in Fig. 3; and $\Delta f_0$ is the width of such passband.

During the time when the inequality of Equation 3 is satisfied, there are two possible conditions in regard to the relative instantaneous numerical frequencies of the signals of transmitting oscillator 10 and local oscillator 19, viz., (1) when $f_{10}>f_{19}$ i. e., the numerical value of the instantaneous frequency of the signal supplied by transmitting oscillator 10 is greater than the numerical value of the signal produced by local oscillator 19; and conversely (2) when $f_{19}>f_{10}$, i. e., the numerical value of the instantaneous frequency of the signal produced by local oscillator 19 is greater than the numerical value of the frequency of the signal supplied by transmitting oscillator 10. The AFC circuit included in Figs. 1 and 2 is capable of distinguishing between such difference in Equation 3 viz., when the inequality is satisfied with the condition when $f_{10}>f_{19}$ in a manner which will be subsequently explained.

Assuming initially the condition $f_{10}>f_{19}$ for the purpose of the next succeeding explanation, the inequality applying is $$f_0+\frac{\Delta f_0}{2}\geqq f_0+\Delta f_{10}\sin\omega t-\Delta f_{19}\sin(\omega+\Delta\omega)t\geqq f_0-\frac{\Delta f_0}{2} \quad (4)$$

Since $f_0 = f_{10} - f_{19}$ in Equation 2 and letting $$D(t) = \Delta f_{10} \sin \omega t - \Delta f_{19} \sin (\omega - \Delta\omega)t =$$

$$\Delta f_{10} \sqrt{1 - \frac{2\Delta f_{19}}{\Delta f_{10}} \cos \Delta\omega t + \left[\frac{\Delta f_{19}}{\Delta f_{10}}\right]^2} \sin (\omega t + \theta) \quad (5)$$

where $$\theta = \tan^{-1} \frac{\frac{\Delta f_{10}}{\Delta f_{19}} \sin (\Delta\omega t)}{1 - \frac{\Delta f_{10}}{\Delta f_{19}} \cos (\Delta\omega t)} \quad (6)$$

then for the initially assumed condition $f_{10} > f_{19}$ $$f_0 + \frac{\Delta f_0}{2} \geqq f_0 + D(t) \geqq f_0 - \frac{\Delta f_0}{2} \quad (7)$$

or $$\frac{\Delta f_0}{2} \geqq D(t) \geqq -\frac{\Delta f_0}{2} \quad (8)$$

Equation 8 determines the length of time that the 70 megacycle I. F. voltage pulses in the output of the converter lie within the passband of the tuned I. F. amplifier. A graphical representation of the $D(t)$ term in Equation 8 is given in Fig. 4A in which curve 73 is the envelope of the $D(t)$ function, the ordinate is frequency $f$, the abscissa is time $t$, $f_0$ is the mid-frequency of a $\Delta f_0$ passband of the tuned I. F. amplifier; and $$\frac{\Delta f_0}{2}$$

is ½ the passband of the tuned I. F. amplifier.

Referring again to Fig. 4A, the heavy lines crossing zero axis 76 and lying between the $$\frac{\Delta f_0}{2}$$

limits represent the time intervals during which the 70 megacycle I. F. voltage pulses are presented to the passband of the tuned I. F. amplifier for the initially assumed condition $f_{10} > f_{19}$. These time portions result in a train of relatively narrow or short time-duration voltage pulses 74, 74 and a relatively wide or long-time duration voltage pulse 75 interposed approximately at the center of such voltage pulse train as illustrated in Fig. 4B, in response to certain circuit conditions which will be mentioned below.

In Fig. 4A, the ratio of $$\frac{\Delta f_{10}}{\Delta f_{19}}$$

i. e., the ratio of deviation ranges, determines how close the $D(t)$ envelope 73 approaches zero axis 76 for the initially assumed condition $f_{10} > f_{19}$ as abovenoted or in other words, how long the $D(t)$ envelope 73 spends within the $$\frac{\Delta f_0}{2}$$

limits of zero axis 76. This ratio of sweep deviations has a direct bearing on the length of the wide or long voltage pulse 75 in Fig. 4B; and provides a maximum voltage pulse length when $\Delta f_{10} = \Delta f_{19}$, i. e., when the deviation of transmitting oscillator 10 equals the deviation of local oscillator 10.

The voltage pulse train provided in the output of tuned I. F. amplifier in the manner illustrated in Fig. 4B is presented to the synchronizing control shown in Fig. 2. In the latter control, the voltage pulses are detected in voltage doubler 39, 40, 41, 42 and 43 from which a train of negative voltage pulses is supplied to and amplified in pentode amplifier 45. The resulting train of amplified positive pulses is then clipped via clipper rectifier 53 and voltage regulator tube 54 to constitute a train of clipped positive voltage pulses.

The clipped positive voltage pulses are then integrated in integrator network 55, 56 which as hereinbefore mentioned, is provided with a preselected time-constant for a purpose that will presently appear. This network integrates the short time-duration voltage pulses to provide a corresponding train of average voltage pulses 77, 77 shown in Fig. 4C. These average voltage pulses applied to the control grid of gas tube 57 are inadequate from a magnitude standpoint to overcome the bias on the control grid; and, as a consequence, do not cause any action in the circuits of Figs. 1 and 2. The network also integrates the long time-duration voltage pulse 75 in Fig. 4A to provide an average voltage pulse 78 shown in Fig. 4C. This average voltage pulse applied to the control grid of gas tube 57 has sufficient magnitude to overcome the bias on the latter grid and thereby institute discharge in gas tube 57. Referring to Fig. 4C, it will be noted that gas tube 57 is triggered at point 79 on the integrated average voltage 78 at which point approximately the latter voltage tends to overcome the bias on the control grid of the gas tube 57.

The institution of discharge in gas tube 57 enables the commercial 60-cycle 110-volt current to flow in the anode-cathode circuit thereof. This energizes the operating winding 61 of relay 62 in selector 27 and thereby actuates armature 65 from the first contact 67 to the second contact 68 to disconnect search control 34 from sweep control 29 and substantially simultaneously therewith to connect the frequency discriminator to the latter control. This operation of gas tube 57 is conventional. Now, the frequency discriminator, in response to the I. F. component, activates sweep control 29 to vary the frequency sweep of local signal oscillator 19 over the predetermined range at a time-rate substantially the same as the time-rate sweep of the signal frequency of transmitting oscillator 10.

Referring again to Fig. 4B, the narrow or short-time duration voltage pulses tend to indicate that the signal frequency of the transmitting and local oscillators 10 and 19, respectively, are being swept in opposite numerical directions, and hence the passband to which the I. F. amplifier is tuned is traversed by the narrow 70 megacycle I. F. voltage pulses so quickly that very little energy of those pulses gets into the amplifier. On the other hand, the wide or long time-duration pulse tends to indicate that (1) the signal frequencies of the transmitting and local oscillators 10 and 19, respectively, are being swept in the same numerical direction; (2) the numerical value of the instantaneous frequency of the signal of transmitting oscillator 10 is higher than the numercial value of the instantaneous frequency of the signal of local oscillator 19; and (3) the time-rate of change of the frequencies of the signals of transmitting and local oscillators 10 and 19, respectively, are substantially the same, or in other words, the time-rate of change of the frequency of the 70 megacycle I. F. component presented to tuned amplifier 20 is substantially a minimum. Hence, the passband to which the I. F. amplifier is tuned is traversed by the wide 70 megacycle I. F. voltage pulse for a relatively long time interval whereby a relatively large amount of the energy of the latter pulse passes into the amplifier. Thus, the signal frequency of local oscillator 19 is caused automatically to lock-in or resume tracking the signal frequency of transmitting oscillator 10 at the 70-megacycle difference therebetween, in response to the signal of transmitting oscillator 10 when the latter signal of adequate amplitude is picked-up by receiving antenna 16 after the latter signal has been faded to a negligible amplitude or has been interrupted.

Assuming now the condition $f_{19} > f_{10}$, above defined, for the purpose of the next succeeding explanation, then the inequality applying is $$-f_0 + \frac{\Delta f_0}{2} \geqq f_0 + D(t) \geqq -f_0 - \frac{\Delta f_0}{2} \quad (9)$$

or $$-2f_0+\frac{\Delta f_0}{2}\geqq D(t)\geqq -2f_0-\frac{\Delta f_0}{2} \qquad (10)$$

Figure 4:
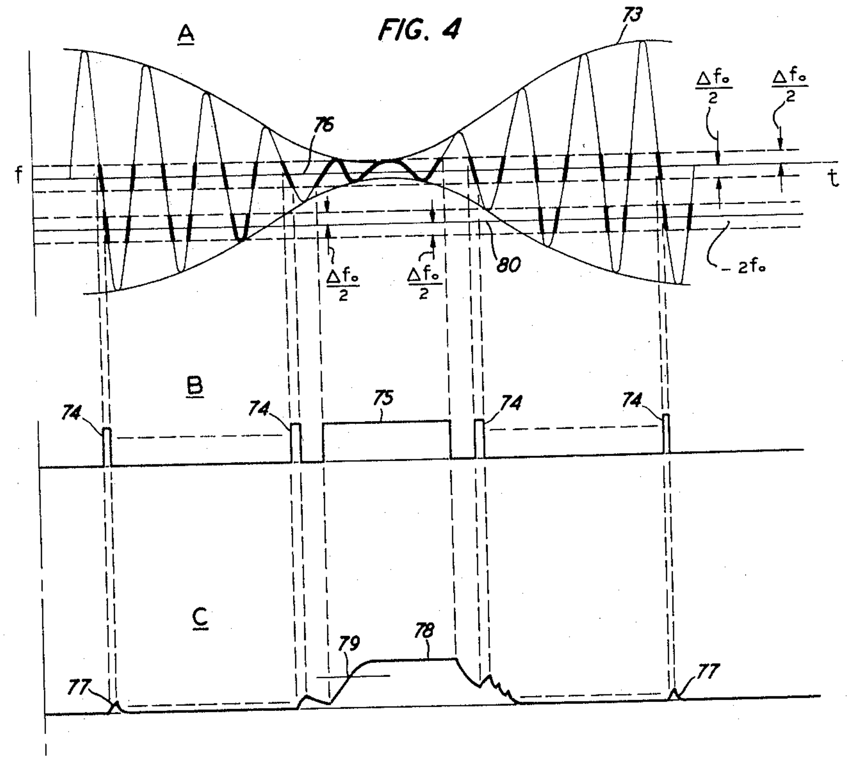
Fig. 4 is a group of curves delineating action obtainable in Fig. 1.

Equation 10 implies that the 70 megacycle I. F. voltage pulses in the output of converter 18 lie within the passband of the tuned I. F. amplifier. As above-mentioned a graphical representation of the D($t$) term in Equation 10 is given in Fig. 4A in which curve 73 is the envelope of the D($t$) function; $\Delta f_0$ is the passband of the tuned I. F. amplifier; and $$\frac{\Delta f_0}{2}$$

is ½ the latter passband. Referring to Fig. 4A the heavy lines crossing zero axis 80 represent the short time intervals during which the 70 megacycle I. F. voltage pulses are presented to the passband of the tuned I. F. amplifier. Hence, these time portions result in a train of relative narrow or short time-duration voltage pulses substantially equivalent to voltage pulses 74, 74 in Fig. 4B, resulting from the abovenoted assumed condition $f_{10}>f_{19}$. The voltage pulse train generated by the $f_{19}>f_{10}$ condition, and presented to the synchronizing control in Fig. 2 is detected, amplified, clipped and integrated, successively, therein to provide a corresponding train of average voltage pulses approximately equal to the train of average voltage pulses 77 shown in Fig. 4. The integrated pulse train applied to the control grid of gas tube 57 causes no action in the circuits of Figs. 1 and 2, for the reason hereinbefore mentioned.

In Fig. 4A, it will be thus noted in regard to the term $(-2f_0)$ of Equation 10 for the assumed condition of $f_{19}>f_{10}$ that D($t$) envelope 73 remains within the limits $$\frac{\Delta f_0}{2}$$

in regard to zero axis 80 for short periods of time only but does not remain within such limits for a time portion equivalent to that required to produce in the output of the tuned I. F. amplifier a voltage pulse substantially equal to voltage pulse 75 in Fig. 4B. As a consequence, the assumed condition $f_{19}>f_{10}$ does not produce via integrator network 55 and 56 in Fig. 2 an average integrated voltage approximately equal to the average voltage 78 in Fig. 4C. Hence, the assumed condition $f_{19}>f_{10}$ allows relay 62 to remain in the unoperated state whereby armature 65 rests on the first contact 67 in relay 62 or selector 27 to continue the connection of search control 34 to sweep control 29 for varying signal frequency of local oscillator 19. Therefore, the assumed condition $f_{19}>f_{10}$ does not permit the signal frequency of local oscillator 19 automatically to lock-in or track the signal frequency of transmitting oscillator 10.

Figure 5:
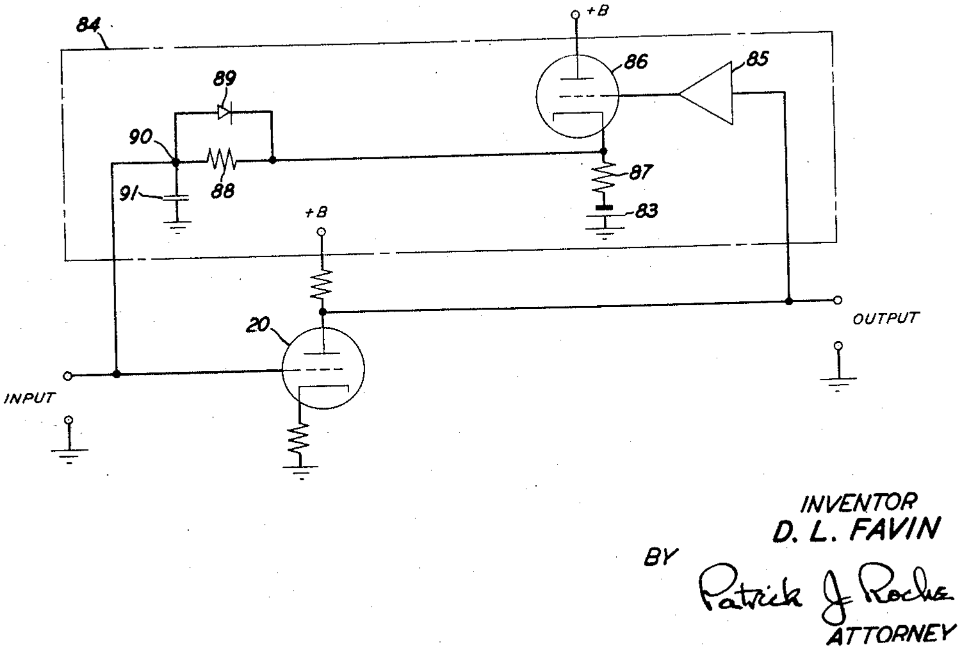
Fig. 5 is a schematic diagram of a circuit element in Fig. 1.

An AGC or automatic gain control circuit 84 provided for tuned 70 megacycle I. F. amplifier 20 in Fig. 1 is fast-acting only during the interval of lock-in between the signal frequencies of the transmitting and local oscillators 10 and 19, respectively. Referring to Fig. 5, the AGC circuit 84 comprises amplifier 85 connecting the anode circuit of the tuned I. F. amplifier, which may comprise one or more stages, as desired, to the control grid of cathode follower 86 whose cathode is connected through resistor 87 and battery 83 to ground. This cathode is also connected to the control grid of the tuned I. F. amplifier through a network including resistor 88 and varistor 89 in parallel and having a point 90 common to resistor 88 and the cathode of varistor 89 connected through capacitor 91 to ground.

In the operation of the AGC circuit, let it be assumed that $\tau_1=R_1C_1$, the time-constant under a normal synchronous operation of Fig. 1 in which $R_1$ is resistor 88 and $C_1$ is capacitor 91; and that $\tau_2=(R_v+R_k)C_1$, the time-constant fast acting at the lock-in interval in which $R_v$ is the forward impedance of the varistor and $R_k$ is the output impedance of the cathode follower. During the interval of nonsynchronous operation of Fig. 1, i. e., when search control 34 is effective to activate sweep control 29 for varying the frequency of local oscillator 19, the average level of the train of 70 megacycle I. F. voltage pulses applied to the grid of cathode follower 86 in Fig. 5 is negative and close to zero. As these pulses have a duration which is less than $\tau_2$, capacitor 91 ($C_1$) is slowly charged to some value say, for example, −4 volts. When this condition has been attained, the tuned I. F. amplifier is working close to maximum gain.

At the time of the frequency lock-in above explained a long 70 megacycle I. F. voltage of the order of −15 volts, similar to pulse 75 in Fig. 4B, is supplied to the control grid of cathode follower 86 in Fig. 5. Now, varistor 89 is biased in the forward direction and capacitor 91 ($C_1$) discharges with the time-constant $\tau_2$ which time is very much less than the duration of the long pulse. This lowers the gain of the tuned I. F. amplifier which resumes quickly the normal gain. This gain satisfies the dynamic AFC loop requirements whereby synchronism or automatic lock-in is maintained.

While the AFC system of Fig. 1 has been hereinbefore explained for effecting automatic synchronization or tracking upon the fading or disappearance of an incoming signal at a distant receiving terminal followed by a reappearance of such signal thereat for the assumed condition $f_{10}>f_{19}$, it will be understood that the system will also function in a similar manner for a condition $f_{19}>f_{10}$. In connection with the latter condition, all that is necessarry is to present the frequency sweeps of the transmitting and local oscillators 10 and 19, respectively, with the proper relative numerical frequency values and then adjust the sweep controls 11 and 29 to maintain the preset frequency sweeps. In effect, this will interchange the zero lines 80 and 76 with regard to the D($t$) envelope 73 in Fig. 4A whereby the wide voltage pulses 75 and 78 in Figs. 4B and 4C, respectively, are produced to activate selector 27 in Fig. 1 for the condition $f_{19}>f_{10}$ substantially in the manner above discussed with reference to the condition $f_{10}>f_{19}$.

What is claimed is:

1. An automatic frequency control for locking-in the frequencies of two heterodyned signals at a predetermined frequency difference therebetween comprising means connectable to a source of one of the signals for cyclically sweeping the frequency thereof over one range at a time-rate different from a time-rate sweep of the other of said signals over another frequency range which partly overlaps the first-mentioned range, a frequency discriminator connectable to said one source, said frequency discriminator being responsive to one portion of a component heterodyned from the one and other signals and having the predetermined frequency therebetween for sweeping the signal frequency of said one source over said one range at a time-rate substantially the same as the time-rate frequency sweep of the other signal, and means responsive to a different portion of said heterodyned component for controlling the connection of said sweeping means and frequency discriminator respectively to said one signal source, said control means connecting said sweeping means to said one signal source and disconnecting said frequency discriminator therefrom substantially upon the disappearance of the other signal and thereby substantially upon the disappearance of said different component portion, said control means further responding to the reappearance of the other signal and thereby to the reappearance of said different component portion for disconnecting said sweeping means from said one signal source and connecting said frequency discriminator thereto when the instantaneous frequencies of the one and other signals have predetermined relative numerical values, the frequencies of the one and other signals are simultaneously varying in the same numerical direction, and the time-rate of change of the predetermined frequency difference between the one and other signals as represented by the frequency of said component is a minimum whereby the one and other signals are locked-in at the predetermined frequency difference therebetween.

2. The control according to claim 1 in which said control means responds to the reappearance of the other signal and thereby to the reappearance of said different component portion when the instantaneous frequencies of the one and other signals have such predetermined relative numerical values that the numerical value of the frequency of the other signal is higher than the numerical value of the frequency of the one signal.

3. The control according to claim 2 in which the last-mentioned numerical value of the frequency of the other signal is lower than the last-mentioned numerical value of the frequency of the one signal.

4. The control according to claim 1 in which said last-mentioned different component portion comprises a relatively wide voltage pulse, and said control means includes an electromagnetic relay having at least two contacts and an armature which is normally biased to one of said contacts, said one contact is connected to said sweeping means and the other of said contacts is connected to said frequency discriminator, and an integrating network provided with a preselected time-constant, said net work integrating the wide voltage pulse to enable said control means to provide an average voltage whose magnitude is adequate to energize said relay to overcome the bias on said armature and thereby actuate said armature from said one contact to said other contact for disconnecting said sweeping means from said one signal source and substantially simultaneously therewith for connecting said frequency discriminator to said one signal source whereby the one and other signals are locked-in at the predetermined frequency difference therebetween.

5. An automatic frequency control apparatus for signals of two sources swept over different frequency ranges overlapping in part and locked-in at a predetermined frequency difference therebetween, comprising a converter supplied with the signals of said two sources for providing a component having the predetermined frequency, means connectable to one of said sources for cyclically sweeping the frequency thereof over one of said ranges at a time-rate which is different from the time-rate sweep of the frequency of the other of said sources, a frequency discriminator responsive to one portion of said component and connectable to said one source for sweeping the frequency thereof over its frequency range at a time-rate substantially the same as that of the time-rate frequency sweep of the other of said sources, and means responsive to another portion of said component to control the connection of said sweeping means and frequency discriminator respectively to said one source, said control means connecting said sweeping means to said one source and substantially simultaneously therewith disconnecting said frequency discriminator from said one source when the signal of said other source has been momentarily interrupted or has faded below a predetermined magnitude thereby causing a corresponding interruption or fading of said second component portion, said control means being also responsive to the resumption of the signal of said other source or the return thereof to at least said predetermined magnitude and thereby to a corresponding resumption or return of said second component portion for disconnecting said sweeping means from said one source while substantially simultaneously therewith connecting said frequency discriminator to said one source when the instantaneous frequency of said other source is numerically higher than the instantaneous frequency of the signal of said one source, the frequencies of the signals of said one and other sources are being simultaneously varied in the same numerical direction, and the time-rates of frequency change of said one and other source are substantially equal whereby the difference frequency between the signals of said one and other sources as represented by the frequency of said component is locked-in at the predetermined frequency of said component.

6. The apparatus according to claim 5 in which said second component portion comprises a wide voltage pulse, and said control means is normally biased to disconnect said frequency discriminator from said one source and to connect said cyclically sweeping means to said one source due to the interruption or fading of said other signal including said second component portion, said control means including an integrating circuit having a preselected time-constant to enable the development of an average voltage whose magnitude is adequate to overcome the biasing of said control means and at the same time to operate said last-mentioned means to disconnect said sweeping means from said one source and substantially simultaneously therewith to connect said frequency discriminator to said one source for locking-in the frequencies of the signals of said one and other sources at the predetermined difference therebetween.

7. Automatic frequency control apparatus comprising a first signal source varying in frequency at a certain time-rate over a predetermined range, a second signal source variable in frequency at either of two different time-rates over a predetermined range which is different from but overlaps a portion of said first-mentioned predetermined range, means for mixing the signals of said two sources to provide a component having a frequency equivalent to a predetermined frequency difference between said first and said second signals, means connectable to said second signal source for cyclically varying the signal frequency thereof over said range at a time-rate different from said certain time-rate, means connected to said mixing means and connectable to said second signal source and responsive to a first portion of said component for varying the signal frequency thereof over said range at a time-rate substantially identical with said certain time-rate, and control means connected to said mixing means and responsive to a second portion of said component for controlling the connection of said first-mentioned and second-mentioned frequency varying means respectively to said second signal source, said control means comprising means utilizing said second component portion to produce voltages of at least two different magnitudes, and means normally connecting said first-mentioned frequency varying means to said second signal source and responsive only to the voltage of the higher magnitude of the two different magnitudes to disconnect said last-mentioned frequency varying means from said second signal source and substantially simultaneously therewith to connect said second-mentioned frequency varying means thereto, said control means being responsive to an interruption or fading of the signal of said one source and thereby to the interruption or fading of said second component portion to enable said producing means to produce substantially no voltage and thereby to cause said normally connecting means to connect said first-mentioned frequency varying means to said second signal source, said control means being also responsive to the restoration of the signal of said second source and thereby to the restoration of said second component portion to enable said producing means to produce the voltage of the higher magnitude and thereby cause said normally connecting means to disconnect said first-mentioned frequency varying means from said second signal source and substantially simultaneously therewith to connect said second-mentioned frequency varying means thereto when the numerical frequency of the signal of said first source is higher than that of the signal of said second source, the frequencies of the signals of said first and second sources are simultaneously progressing in the same numerical direction, and the time-rate of change of the frequency difference between the signals of both said last-mentioned sources as represented by said component is substantially a minimum whereby the signals of said one and other sources are locked-in at the predetermined frequency difference therebetween.

8. The apparatus according to claim 7 in which said control means includes an integrator network having a preselected time-constant and the last-mentioned second components portion comprises a relatively wide voltage pulse, said network integrates the wide voltage pulse to produce the voltage of the higher magnitude, and the time-rate of change of the frequency difference between said first and said second signals as represented by the wide voltage pulse is substantially a minimum.

9. An automatic frequency control system comprising a source of incoming signals varying in frequency at a preselected time-rate over a certain range, a local source of oscillations, means for mixing the incoming signals and local oscillations to produce a component having a predetermined frequency which is equal to the frequency difference at which said incoming signals and local oscillations are to be locked-in, a pair of means connectable respectively to said local source for sweeping the frequency of the oscillations thereof at two different time-rates over a preselected range which partly overlaps said certain frequency range, one of said sweeping means sweeping the frequency of the oscillations of said local source at the lower of said two time-rates when the incoming signal has been lost, the other of said sweeping means being connected to said mixing means and responsive to a first portion of said component for sweeping the frequency of the oscillations of said local source at the higher of said two time-rates which higher time-rate is substantially equal to said preselected time-rate, and switching means connected to said mixing means and responsive to a second portion of said component for controlling the connection of the respective sweeping means to said local source, said switching means connecting said one sweeping means to said local source and at the same time disconnecting said other sweeping means therefrom when the incoming signal including said second component portion has been lost, said switching means upon the restoration of the incoming signal including said second component portion operating to disconnect said one sweeping means from said local source and substantially simultaneously therewith to connect said other sweeping means thereto, said last-mentioned operation of said switching means being in response to said second component portion when the numerical value of the frequency of the incoming signal is higher than the numerical value of the frequency of the local oscillations, the frequencies of both the incoming signal and local oscillations are simultaneously changing in the same numerical direction, and the time-rate of change of the predetermined frequency difference between the incoming signal and local oscillations as represented by the frequency of said component is substantially a minimum whereby the frequencies of the incoming signal and local oscillations are locked-in at the last-mentioned frequency difference.

10. The system according to claim 9 in which said switching means includes means responsive to the last-mentioned restoration of said incoming signal including said second component portion for developing a voltage of a predetermined magnitude which operates said switching means to disconnect said one sweeping means from said local source and to connect said other sweeping means thereto.

11. The system according to claim 10 in which said switching means includes means for normally biasing said switching means to connect said one sweeping means to said local source and to disconnect said other sweeping means therefrom when the incoming signal and said second component portion have been lost, and said voltage developing means develops the predetermined voltage magnitude in response to the last-mentioned restoration of the incoming signal including said second component portion, said last-mentioned predetermined voltage effectively nullifying the biasing effect of said normal biasing means and thereby operating said switching means to disconnect said one sweeping means from said local source and to connect said other sweeping means thereto.

12. An automatic frequency control system comprising a first signal source varying in frequency at one time-rate over a preselected range, a second signal source variable in frequency at either one of two different time-rates over a preselected range which is different from but partly overlaps said first-mentioned frequency range, a mixer for the signals of both said sources to provide a component having a predetermined frequency, a tuned amplifier for selecting said component from the output of said mixer, a frequency discriminator responsive to one portion of said component selected by said tuned amplifier and connectable to said second signal source for sweeping the signal frequency thereof over said preselected range at time-rate substantially equal to said one time-rate, means connectable to said second signal source for cyclically sweeping the signal frequency of said second source over said preselected range at a time-rate different from said one time-rate, and means responsive to a second portion of said component selected by said tuned amplifier for controlling the connection of said frequency discriminator and sweeping means respectively to said second signal source, said controlling means comprising another amplifier including at least a control grid, a cathode and an anode, a voltage doubler connected between the output of said tuned amplifier and the control grid and cathode of said other amplifier, a voltage regulator tube, a solid rectifier having an anode and cathode, said regulator tube and rectifier being connected in series in a conducting direction across the anode and cathode of said other amplifier, said last-mentioned amplifier and regulator being provided with such circuit parameters in the absence of an input voltage of said second component portion supplied thereto from said voltage doubler that the voltage drop across the plate and ground of said other amplifier is slightly less than the voltage drop across said regulator tube whereby the plate of said rectifier is provided with a positive bias of preselected magnitude to effect a proportionate clipping action on the amplitude of the last-mentioned input voltage supplied to said other amplifier, a gaseous discharge device including at least a control grid, cathode and anode, said last-mentioned grid being biased to hold said gaseous device normally in a nonconduction condition, said last-mentioned cathode including an operating winding in circuit therewith, at least two electrical contacts one of which is connected to said sweeping means and the other to said frequency discriminator, an armature normally biased to said one contact, and an integrator network having a preselected time-constant and connected between said rectifier and said last-mentioned control grid and cathode, said controlling means having said armature on said one contact to disconnect said frequency discriminator from said second signal source and to connect said sweeping means to said second signal source upon an interruption or fading of the signal of said first source at the input of said mixer of said second component portion supplied to said voltage doubler, said controlling means responding to said second component portion supplied to said voltage doubler upon the return of the signal of said first source to the input of said mixer for disconnecting said sweeping means from said second signal source and substantially simultaneously therewith connecting said frequency discriminator thereto, said control means passing said last-mentioned second component portion through said voltage regulator, other amplifier, regulator tube, solid rectifier, and integrator network for developing a voltage of adequate magnitude which is supplied to the grid of said gas tube to overcome the bias thereon and thereby institute the conduction condition therein, said last-mentioned condition causing said gas tube to supply energizing current to said operating winding to nullify the bias on said armature and thereby actuate said armature from said one contact to said other contact for effectuating said last-mentioned disconnection of said sweeping means from said second signal source and the connection of said frequency discriminator thereto when the numerical value of frequency of the signal of said first source is higher than the numerical value of the frequency of the signal of said second source, the frequencies of the signals of said first and second sources are simultaneously varying in the same numerical direction, and the time-rate of change of the frequency of the signal of said first source is substantially equal to the time-rate of change of the frequency of the signal of said second source whereby the frequencies of the signals of said first and second sources are locked-in at a difference equal to the predetermined frequency of said component.

References Cited in the file of this patent

UNITED STATES PATENTS

| | | |
|---|---|---|
| 2,594,263 | Munster | Apr. 22, 1952 |
| 2,698,904 | Hugenholtz | Jan. 4, 1955 |